US008055933B2

(12) United States Patent
Jaehde et al.

(10) Patent No.: US 8,055,933 B2
(45) Date of Patent: Nov. 8, 2011

(54) DYNAMIC UPDATING OF FAILOVER POLICIES FOR INCREASED APPLICATION AVAILABILITY

(75) Inventors: Astrid A. Jaehde, Austin, TX (US);
Manjunath B. Muttur, Karnataka (IN);
Thomas V. Weaver, Dripping Springs, TX (US)

(73) Assignee: International Business Machines Corporation, Armonk, NY (US)

( * ) Notice: Subject to any disclaimer, the term of this patent is extended or adjusted under 35 U.S.C. 154(b) by 122 days.

(21) Appl. No.: 12/506,420

(22) Filed: Jul. 21, 2009

(65) Prior Publication Data

US 2011/0022882 A1 Jan. 27, 2011

(51) Int. Cl.
*G06F 11/00* (2006.01)
(52) U.S. Cl. .......................................................... 714/4
(58) Field of Classification Search ..................... 714/4;
709/223–229
See application file for complete search history.

(56) References Cited

U.S. PATENT DOCUMENTS

| | | | |
|---|---|---|---|
| 5,987,621 A | 11/1999 | Duso et al. | |
| 6,438,705 B1 * | 8/2002 | Chao et al. ....................... | 714/4 |
| 6,578,158 B1 | 6/2003 | Deitz et al. | |
| 7,451,347 B2 | 11/2008 | Subbaraman et al. | |
| 7,460,470 B2 | 12/2008 | McGee et al. | |
| 7,512,832 B1 | 3/2009 | Lent et al. | |
| 7,613,827 B2 * | 11/2009 | Bruck et al. ................... | 709/238 |
| 2002/0198996 A1 | 12/2002 | Sreenivasan et al. | |
| 2007/0010971 A1 * | 1/2007 | Nikolova et al. ............... | 702/188 |

OTHER PUBLICATIONS

"Remote Notification and Monitoring—CAT UPS", Caterpillar, 2008, 2 pages.

* cited by examiner

*Primary Examiner* — Amine Riad
(74) *Attorney, Agent, or Firm* — Stephen J. Walder, Jr.; David A. Mims, Jr.

(57) ABSTRACT

Mechanisms are provided for performing a failover operation of an application from a faulty node of a high availability cluster to a selected target node. The mechanisms receive a notification of an imminent failure of the faulty node. The mechanisms further receive health information from nodes of a local failover scope of a failover policy associated with the faulty node. Moreover, the mechanisms dynamically modify the failover policy based on the health information from the nodes of the local failover scope and select a node from the modified failover policy as a target node for failover of an application running on the faulty node to the target node. Additionally, the mechanisms perform failover of the application to the target node based on the selection of the node from the modified failover policy.

20 Claims, 4 Drawing Sheets

DYNAMIC UPDATING OF FAILOVER POLICIES FOR INCREASED APPLICATION AVAILABILITY

BACKGROUND

The present application relates generally to an improved data processing apparatus and method and more specifically to mechanisms for dynamically updating failover polices in a high availability cluster of computing devices so as to increase application availability.

A high availability cluster is a group of loosely coupled processors, computing devices, or the like, collectively referred to as "nodes," that all work together to ensure a reliable service to clients, e.g., client computing devices, processors, or the like. Each node in the high availability cluster runs a clusterware produce, such as High Availability Cluster MultiProcessing (HACMP), available from International Business Machines Corporation of Armonk, N.Y., which detects node, network, or communication adapter failures and ensures that applications are automatically restarted on a backup node. With HACMP, up to 32 nodes may be running HACMP and may be either actively running an application or waiting to take over should another node fail. Data on file systems of the nodes can be shared between the nodes in the cluster. With HACMP, daemon applications are used to monitor the state of the nodes of the cluster and coordinate responses to events.

In the event of a failure of one of the nodes, the HACMP clusterware selects one of the surviving nodes of the cluster as a target for application recovery based on a predefined node failover order. Alternatively, HACMP may dynamically determine the target node for failover based on free processor resources, free memory, traffic considerations, or the like. This order of failover is referred to as the "failover policy."

Many high availability clusters are implemented within a single site, i.e. the nodes of the cluster are geographically local to one another. However, some high availability cluster mechanisms extend the scope of high availability from within a lab or datacenter to sites separated by-geographical distances. This ensures that even when an entire cluster in a site/location fails, applications will failover to a node in another site located miles away.

Application failover within a site is fast and seamless because the clusters within a site have more reliable and redundant heartbeat networks. Furthermore, shared disk setup enables applications to get access to the latest copy of data after the recovery is performed. However, with distributed high availability clusters that span multiple sites that are geographically remote from one another, heartbeat paths across the sites are limited to Internet Protocol (IP) networks, wide area networks, or the like, which is less reliable than the connections within a single site. Moreover, the slower rate of data mirroring between the sites in distributed high availability clusters denies the application access to the latest copy of data after the recovery is performed. Therefore, failover to nodes in a remote site is-preferred only when all nodes in the local site are down.

To better handle such failover preferences, failover scopes are defined, e.g., a local scope and a global scope, each comprising a subset of identified nodes of a cluster. Applications may be associated with an ordered list of one or more failover scopes. When a failover occurs, each application automatically fails over to a surviving node that is listed within its failover scope specified in the ordered list. Based on the ordering, such failover occurs sequentially until the failover is performed successfully. For example, failover may first be attempted to each of the nodes within the current failover scope (local site) before attempting failover to a node in a next failover scope (remote site). If no node within the first failover scope is able to accept the failover, e.g., none of the nodes have survived the failure, the resource group may be set to automatically failover to a node listed in the next failover scope and so on until there is no failure detected.

SUMMARY

In one illustrative embodiment, a method, in a data processing system, is provided for performing a failover operation of an application from a faulty node of a high availability cluster to a selected target node. The method comprises receiving a notification of an imminent failure of the faulty node. The method further comprises receiving health information from nodes of a local failover scope of a failover policy associated with the faulty node. Moreover, the method comprises dynamically modifying the failover policy based on the health information from the nodes of the local failover scope and selecting a node from the modified failover policy as a target node for failover of an application running on the faulty node to the target node. Additionally, the method comprises performing failover of the application to the target node based on the selection of the node from the modified failover policy.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiments a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
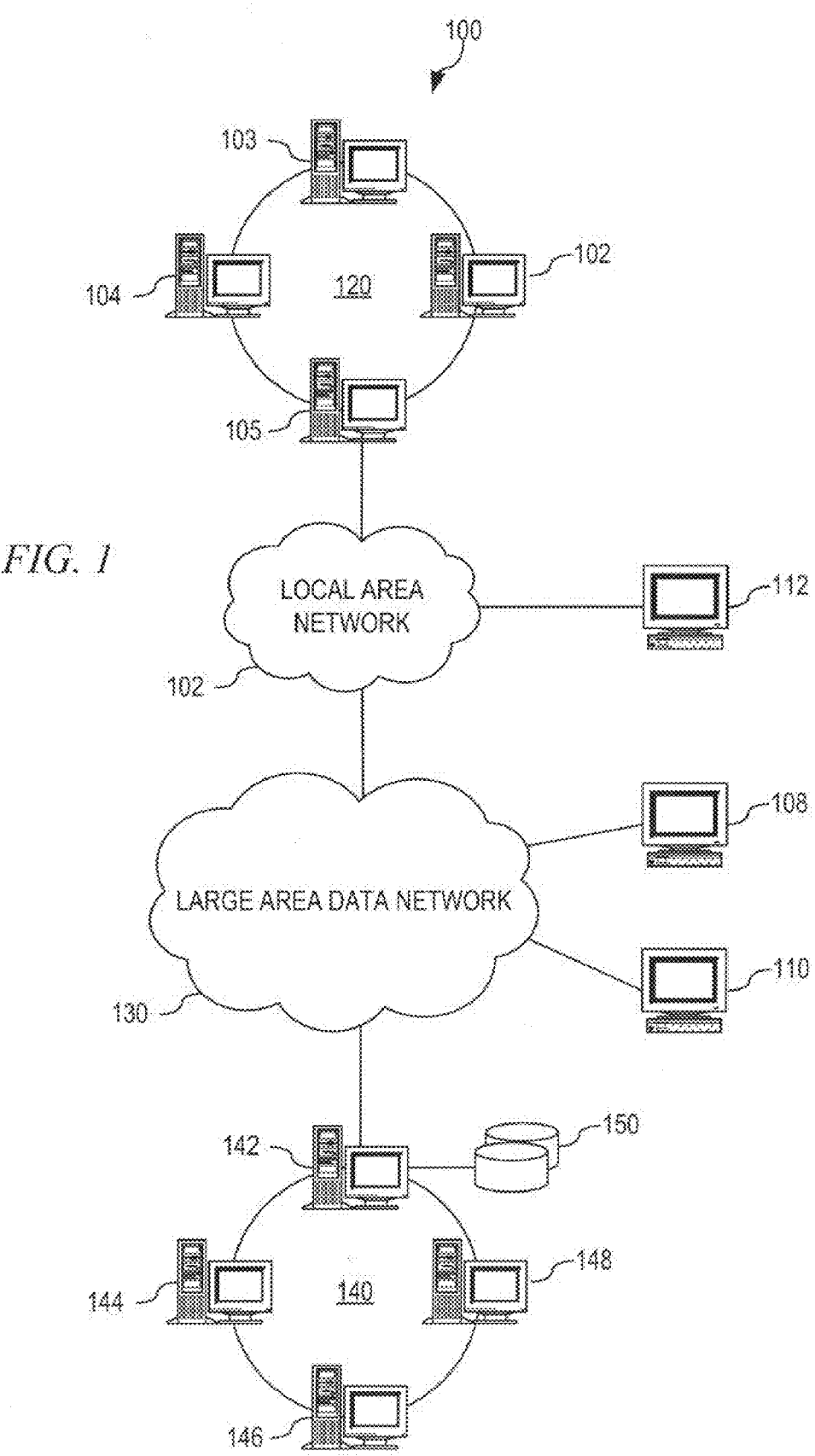
FIG. 1 is an example diagram of a network of data processing system in which exemplary aspects of the illustrative embodiments may be implemented.

As mentioned above, one known failover policy mechanism is to utilize the concept of "scopes" to define groups of nodes of a high availability cluster to which failover is to be attempted. While this "scope" based failover policy provides a way of prioritizing nodes for failover processes, the policy fails to take into consideration information that may affect all nodes within a particular scope prior to performing the failover attempts. That is, information may be available regarding a cause of a failure of a node that indicates that all nodes, or at least a significant enough number of nodes, within the scope of that node may be affected by the same cause of the failure and thus, failover to a node within that scope will ultimately fail. For example, collateral damage caused by fire, earthquake, hurricane, or the like, may cause an instantaneous cluster wide failure within a predefined scope. As a result, there will be no surviving nodes in the same site or current failover scope and thus, failover within the current failover scope should not be performed.

Moreover, there are other conditions that may exist which could affect all the nodes in a cluster, or failover scope, but may not trigger an instantaneous cluster wide failure. For example, a power failure may affect all, or a significant portion, of the nodes in a cluster or failover scope at the same time, but the affect may be different for different nodes based on their characteristics. As an example, nodes in a cluster may have different backup power supplies having different capabilities with regard to providing power to the node in the event of a power failure of the main power source. As a result, some nodes may appear to be available to take over for other nodes, yet in actuality are subject to the same cause of failure but with a delayed failure being imminent. In such a case, the scope based failover policy does not provide any increase in application availability and may actually lead to wasted time and resources.

The illustrative embodiments provide a mechanism for dynamically updating failover polices in a high availability cluster of computing devices so as to increase application availability. With the mechanisms of the illustrative embodiments, if a node in a cluster fails; such as due to a power failure or other failure that may affect all of the nodes within a predefined failure scope, but possibly in a delayed manner, the nature of the cause of the failure is analyzed to determine the scope of its impact. The objective is to dynamically determine the most reliable node of the high availability cluster in the event of a failure and drive the failover to that node, even to the extent of overriding any established or default failover policies.

With the mechanisms of the illustrative embodiments, just before the application failover process occurs, the clusterware, such as HACMP, initiates a discovery of state/health information on active nodes in the cluster, to determine if they have been affected by a failure as well. During this discovery process, the clusterware performs an assessment of failure across the cluster and determines the scope of the problem, i.e. the nodes that are affected by the same cause of failure, or a related cause of failure, as the failed node. The affects may be immediate, in that nodes may not respond to discovery requests due to a hard failure of those nodes, or they may be imminent in that a node may be subject to the same cause of failure but may not yet have failed due to the presence of mitigating equipment, resources, or the like, e.g., an uninterruptable power supply, or the like. If there are no nodes in the current failover scope which are not vulnerable to the same type of failure, then a node in a remote site, or different failover scope, is considered as a failover target. The clusterware in each surviving node of the cluster communicates with the clusterware of each other surviving node in the cluster to agree upon the new failover policy. This new failover policy overrides the default or previously held failover policy and becomes the effective failover policy until the cause of the failure ceases to exist. Thus, with the mechanisms of the illustrative embodiments, the information from all of the surviving nodes regarding their own health will override the choice of some nodes as a failover target under a default or previous failover policy.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electro-magnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable radio frequency (RF), etc.

Computer program code for carrying out operations of the present invention may be Written in any combination of one or more programming languages, including an object oriented programming language such as Java™, Smalltak™. C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In addition, the program code may be embodied on a computer readable storage medium on the server or the remote computer and downloaded over a network to a computer readable storage medium of the remote computer or the users' computer for storage and/or execution. Moreover, any of the computing systems or data processing systems may store the program code in a computer readable storage medium after having downloaded the program code over a network from a remote computing system or data processing system.

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
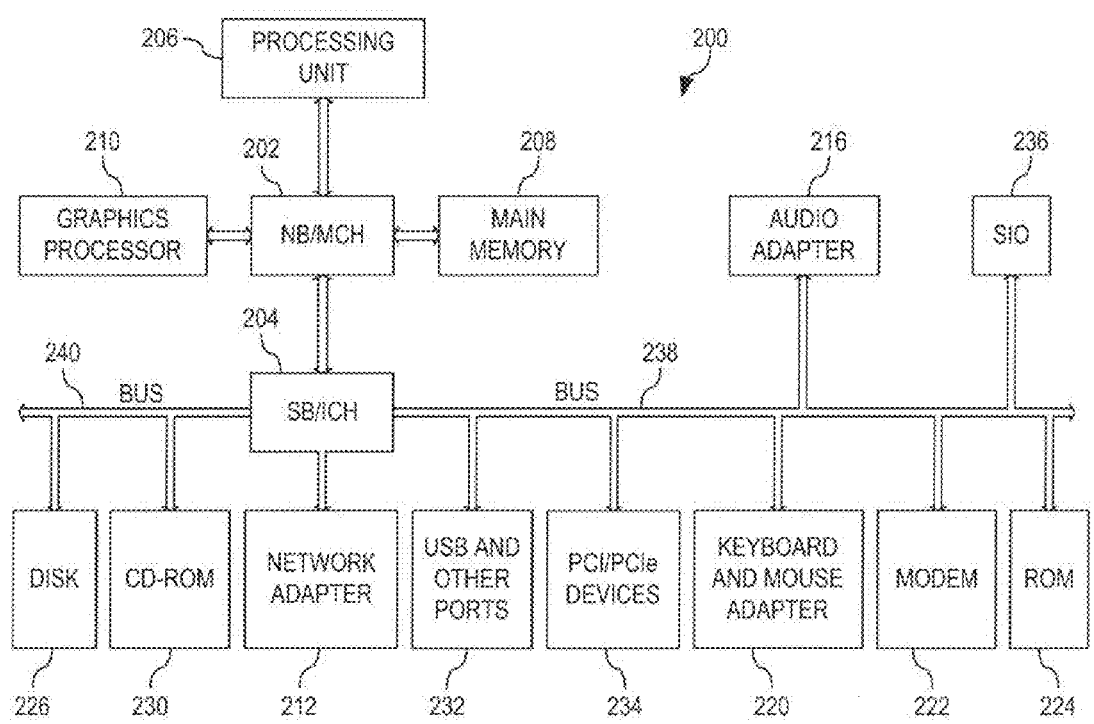
FIG. 2 is an example block diagram of a data processing device/system in accordance with one illustrative embodiment.

The illustrative embodiments may be utilized in many different types of data processing environments but are especially well suited for use in a distributed data processing environment. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems 100 in which exemplary aspects of the illustrative embodiments may be implemented. Network data processing system 100 contains a local area network (LAN) 102 and a large area data network 130, which are the media used to provide communication links between various devices and computers connected together within network data processing system 100. LAN 102 and large area data network 130 may include connections, such as wired communication links, wireless communication links, fiber optic cables, and the like.

In the depicted example, server computing devices 102-105 are connected to LAN 102. The server computing devices 102-105 may comprise a cluster 120, for example, that hosts one or more applications and provides a failover functionality via clusterware, such as High Availability Cluster MultiProcessing (HACMP), available from International Business Machines Corporation of Armonk, N.Y., running on each of the server computing devices 102-105 and augmented to include the mechanisms of the illustrative embodiments as detailed hereafter. Each of the computing devices 102-105 are considered to be processing "nodes" of the cluster 120. It should be appreciated that while the nodes of the cluster 120 are depicted in terms of each individual node 102-105 being a server computing device, the present invention is not limited to such. Rather the nodes 102-105 may, in fact, be individual processors of a computing device, such that each server computing device may constitute a plurality of nodes. Furthermore, each node may be a combination of resources from a computing device, such as a processor and its assigned storage resources, such as in a logically partitioned computing device or the like. A "node," as the term is used in the context of the present description, is a set of physical and/or logical resources which support an instance of an operating system, e.g., a set of one or more processors, a memory, a storage, one or more I/O adapters, or the like. For purposes of the following discussion, however, it will be assumed that the nodes of the cluster 120 are server computing devices hosting one or more applications as well as clusterware for managing the cluster 120.

In addition to nodes, or server computing devices, 102-105, client 112 is connected to LAN 102. Clients 108 and 110 are connected to the large area data network 130. These clients 108, 110, and 112 may be, for example, personal computers, workstations, application servers, or the like. In the depicted example, server computing devices (nodes) 102-105 may store, track, and retrieve data objects for clients 108, 110 and 112. Clients 108, 110, and 112 are clients to server computing devices 102-105 and thus, may communication with server computing devices 102-105 via the LAN 102 and/or the large area data network 130 to run applications and interface with running applications on the server computing devices 102-105 and obtain data objects from these server computing devices 102-105. Network data processing system 100 may include additional servers, clients, and other devices not shown.

The large area data network 130 is coupled to the LAN 102. In the depicted example, the large area data network 130 may be the Internet, representing a worldwide collection of networks and gateways that use the Transmission Control Protocol/Internet Protocol (TCP/IP) suite-of protocols to communicate with one another. At the heart of the Internet is a backbone of high-speed data communication lines between major nodes or host computers, consisting of thousands of commercial, government, educational and other computer systems that route data and messages.

Of course, large area data network 130 may also be implemented as a number of different types of networks, such as for example, an intranet, another local area network (LAN), a wide area network (WAN), or the like. FIG. 1 is only intended as an example, and is not intended to state or imply any architectural limitations for the illustrative embodiments described herein. For purposes of providing the present description of the illustrative embodiments, the large area data network 130 will be considered to be the internet or a wide area network such that the cluster 140 is geographically remotely located from the cluster 120.

Server computing device 142 is coupled to large area data network 130 and has an associated storage system 150. Storage system 10 is shown as being directly coupled to the server computing device 142 but, alternatively, may be indirectly accessed by the server computing device 142 via the large area data network 130, via cluster connections within cluster 140, or another network (not shown). The storage system 150 may store data, such as application state information, that may be shared by each of the server computing devices, or nodes, 142-148 of the cluster 140. Moreover, data in the storage system 150 may be updated from application instances executing on one or more of the nodes 102-105 of the cluster 120, such as via a peer-to-peer remote copy of checkpoint/log data, use of mirroring mechanisms to mirror data from one or more storage, devices associated with one or more of the nodes 102-105, or the like.

Server computing device 142 is part of a second cluster 140 that comprises server computing devices 142-148. Again, although these devices are shown as server computing devices 142-148, these are only one example of the type of "nodes" that may be part of the cluster 140 and other types of devices, such as individual processors, logical partitions within a computing device, or the like, may just as well be considered nodes of the cluster 140. Each of the nodes within the cluster 140, like the cluster 120, may provide one or more applications, which may include the same application or applications as the nodes of the cluster 120, and clusterware for managing the cluster 140.

The cluster 140 is geographically remotely located from the cluster 120. However, the combination of the cluster 120 and 140 may be considered together to be a high availability cluster in which clusterware running on each of the nodes is used to manage the high availability cluster and, with particular importance to the mechanisms of the illustrative embodiments, perform failover operations using a failover policy and monitoring of the individual nodes' health in the manner described hereafter. For purposes of description of example illustrative embodiments, and for nomenclature purposes, it will be assumed that the cluster 120 represents a "local" cluster 120 while the cluster 140 represents a "remote" cluster 140 since, in the examples hereafter, it will be assumed that a failure of a node is detected in the cluster 120.

In one illustrative embodiment, one or more of the nodes 142-148 of the cluster 140 operate as standby nodes for one or more of the nodes in cluster 120, as well as for the other nodes within the cluster 140. That is, there may be one or more nodes in each of the clusters 120 and 140 that act as failover nodes for each of the other nodes in the same or different cluster. In one illustrative embodiment, all of the nodes of each of the clusters 120 and 140 act as potential failover nodes for the other nodes in both clusters 120 and 140. As such, the nodes 102-105 and 142-148 of the clusters 120 and 140 may have a same virtual network address on the large area data network 130. Such virtualization of network addresses, e.g., Internet Protocol (IP) addresses, is generally known in the art and thus, a detailed explanation is not provided herein. Suffice it to say that through virtualization of the network addresses of the server computing devices 102-105 and 142-148, network traffic directed to or from these server computing devices 102-105 and 142-148 may make use of the same virtual network address with mechanisms provided for redirecting such traffic to the appropriate server computing device 102-105 and 142-148.

The illustrative embodiments described hereafter provide mechanisms for fault recovery of running application instances on one or more of the nodes 102-105 of the cluster 120 by utilizing a failover policy and monitoring of the individual health of individual cluster nodes with regard to a cause of the fault or failure of a node in the cluster 120. It should be appreciated that while the illustrative embodiments will be described in terms of fault recovery of running application instances on a cluster 120, the illustrative embodiments and the present invention are not limited to such. Rather, instead of the cluster 120, a single server computing device, or other type of node, may be the source of a primary running application instance whose state is made consistent with a corresponding shadow application instance on the remotely located computing device in order to provide fault tolerance, without departing from the spirit and scope of the present invention. The mechanisms of the illustrative embodiments are directed to the manner by which to select which computing device, or node, is to act as the failover node in the case of a failure of another node in the high availability cluster.

Referring now to FIG. 2, a block diagram of a data processing system that may be implemented as a server computing device, such as one or more of server computing devices 102-105 of cluster 120 or server computing devices 142-148 of cluster 140 in FIG. 1, is depicted in accordance with one illustrative embodiment of the present invention. Data processing system 200 may be a symmetric multiprocessor (SMP) system including a plurality of processors 202 and 204 connected to system bus 206. Alternatively, a single processor system may be employed. Data processing system 200 is an example of a computer in which computer usable code or instructions implementing the processes for the illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO),device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Referring again to FIG. 1, each of the nodes 102-105 and 142-148 run an instance of a clusterware application that is responsible for monitoring the current health of the node upon which the instance of the clusterware application is running, communicating that health information to other nodes in the high availability cluster, collaborating with other instances of the clusterware application on other nodes to determine an applicable failover policy based on a determined scope of the cause of the failure as indicated by the health information from other nodes in the high availability cluster, and for performing failover operations in the event of a detected failure of a node in the high availability cluster. For example, a first node 102 in the local cluster 120 may detect an imminent failure of the node 102 and may initiate a failover operation to failover its application instance(s) to another node in the high availability cluster. Typically, in the prior art, such a failover operation involves looking at a pre-established failover policy and attempting to perform the failover operation on a node within the current failover scope of the node 102, i.e. another node in the local cluster 120. The failover is attempted with regard to each node 103-105 in the local cluster sequentially and, only after each failover attempt fails on the local cluster's nodes, does the failover policy call for the failover operation to attempt a failover to a remotely located node 142-148 in a remotely located failover scope, or "global" scope. This failover policy is followed rigidly without regard, a priori, to the health of the individual nodes 103-105 or 142-148 of the local and remote clusters 120 and 140.

With the illustrative embodiments, such a failover policy may be a default failover policy that is followed when conditions do not warrant an override of the default failover policy. The clusterware application instances of the illustrative embodiments, however, provide additional logic and functionality for monitoring the health of each individual node and communicating that health information to each other individual nodes surviving a failure of a node, so that the clusterware application instances on each of the nodes may collaborate and identify a priority of nodes to which failover operations should be performed, such as by majority vote. This priority of nodes may or may not follow the same priority of failover scopes specified in the default failover policy and thus, may actually override the default failover policy based on the current health of the nodes in the various failover scopes. Preference can still be provided to nodes within the same failover scope as the faulty node, i.e. a "local" or "current" failover scope, but the illustrative embodiments allow for the dynamic adjustment of the failover policy to skip the failover attempts of certain nodes, or even failover scopes, when it is determined that the scope of the cause of the failure of the faulty node affects those nodes or failover scopes.

For purposes of the description of the illustrative, embodiments, a failure of a node due to a loss of main power from a main power source, such as a wall outlet or other main power source obtained from the electrical wiring of a enclosure, structure, or building, will be used as an example of the types of causes of failure that the illustrative embodiments may detect, evaluate the scope of, and determine appropriate failover policies for addressing. It should be appreciated, however, that other types of failure causes may be detected and handled by the mechanisms of the illustrative embodiments without departing from the spirit and scope of the illustrative embodiments.

For example, the mechanisms of the illustrative embodiments may be used to detect causes of failure including dynamic logical partition (DLPAR) causes of failure. With the advent of virtualization, dynamic logical partitioning for effective load balancing and increased resource utilization is made possible. The DLPAR operations for achieving such effective load balancing and resource utilization are generally transparent to the clusterware applications. A resource group in the clusterware application has minimum, desired, and maximum resource limits, which may be defined by users. If at any time the resource group does not have minimum required resources, then the clusterware application may initiate a failover operation to a next node as defined by its failover policy. Alternatively, a system administrator, DLPAR script running as part of the clusterware application or as part of a separate hardware management console, can initiate a DLPAR move/remove operation from a set of partitions to cater to a partition which just came up alive or a partition which is experiencing a sudden load spike. If the partitions from which resources are acquired are all part of a single cluster, then it is not logical to failover to a partition which is different from the same resource crunch issue. Thus, as a further example of failures that can be detected using the illustrative embodiments, a loss of resources, or at least a deficiency in available resources, may be detected and used as a basis for performing the operations of the illustrative embodiments in a similar manner as if a power loss is detected as described herein.

Some illustrative embodiments of the present invention may detect any one of a plurality of different types of failures and their causes, evaluate their scope, and generate appropriate failover policies based on collaboration of the clusterware instances on the various surviving nodes. Moreover, some illustrative embodiments may detect a number of different causes of different failures at a same time and, in determining a scope of the failures, take into consideration the interrelationships between such types of failures and their causes. For example, recently installed network device drivers may indicate different symptoms of a single problem such as a memory leakage problem where a program fails to manage memory appropriately and may allocate more and more memory until other applications fail due to a lack of available memory resources. Thus, for example, on a first node, node A, an interface may fail suddenly when a memory leak reaches a certain limit. On another node, node B, the interface may drop network packets intermittently and on a third node, node C, the interface may be too slow to accept new connections and send/receive packets. In such an example, the intelligence of the illustrative embodiments may deduce the fact that all the nodes have a common source of a problem, e.g., a bad network device driver, and accordingly decide its next failover node.

To illustrate, at a high level, the way in which the mechanisms of the illustrative embodiments operate, first assume that that a node 102 in local cluster 120 fails due to a loss of power. Some, or none, of the other nodes 103-105 in the local cluster 120 may be susceptible to this loss of power depending upon the scope of affect of the power loss. For example the loss of power may be only to the node 102 with no other affects on the other nodes 103-105 in the local cluster 120. In this scenario, the loss of power is extremely localized and thus, a standard or default failover policy is sufficient for ensuring application availability. However, if the loss of power affects an entire area, such as a power loss to a building, a portion of a building, an enclosure in which the node 102 is present, or the like, the power loss may affect more than one node 102-105 of the local cluster 120. In such a situation, performing sequential failover to nodes 103-105 of the local cluster will result in failed failover attempts, multiple sequential failovers, and ultimately a loss in availability of the application(s) while failover attempted on each of the nodes.

Each node 102-105 in the local cluster 120 may have different uninterruptable power supply (UPS) capabilities based on the UPS devices coupled to these nodes 102-105 and thus, each node 102-105 may be able to survive the loss of power for a differing amount of time. Thus, node 102 may have a different amount of time that it may remain operational after the detection of a loss of power than other nodes 103-105 in the local cluster 120. Moreover, these UPS devices may provide the initial indication of an imminent power loss to the node 102-105 by signaling the clusterware running on the node 102-105 of the detected loss of power. In response to the detection of such a loss of power by the UPS connected to node 102, for example, the clusterware instances running on the nodes 102-105 may communicate with each other, for example, using heartbeat signals, to inform each other which nodes 102-105 have detected such a loss of power and what the capabilities are of each node 102-105 with regard to surviving the loss of power. The information in these heartbeat signals may be used by the clusterware instances to collaborate, such as by majority vote, to identify a most reliable node of the high availability cluster, whether in local cluster 120 or remote cluster 140. Alternatively, a more centralized approach may be utilized in which a single clusterware instance, such as may be provided in a dedicated cluster management computing device (not shown) in the local cluster 120, or executing on one of the nodes 102-105, may receive the heartbeat signals from all of the surviving nodes 102-105 in the local cluster 120 and determine a most reliable node to which to perform the failover.

The heartbeat signals sent between the clusterware application instances on the nodes 102-105 may include an identity of the node 102-105, an indication of whether there is any detected imminent loss of power from a UPS associated with the node 102-105, what the capabilities are of the node 102-105 for surviving the loss of power, e.g., how long the node 102-105 may operate on power supplied by the UPS before having to be shut down due to loss of power, and other resource usage conditions of the node 102-105 as may be obtained from resource monitors running on the node 102-105. If a node 102-105 fails to provide such a heartbeat signal within a predetermined period of time from a previous heartbeat signal from that node, the node may be considered to not bet a candidate for failover since it is presumed to no longer be available.

It should be appreciated that while a heartbeat mechanism is described herein as being used to determine the health of the various nodes 102-105 of the current or local failover scope, e.g., local cluster 120, other mechanisms can likewise be used. For example, rather than using heartbeat signals, an interrogation-response type system may be used where a clusterware application instance may send interrogation signals to the other clusterware application instances which may then respond with their health information, such as whether an imminent power loss has been detected, a period of time that the node will be able to operate on UPS power, and a current resource usage measurement for the node.

Based on this health information, the clusterware application instances may identify a scope of the affect of the power loss detected by the clusterware application instance of the faulty node 102. Based on this scope of affect of the power loss, and the health of nodes 103-105 affected and not affected by the power loss, the clusterware application instances may select a node as the best option for performing a failover operation. The selection of a node may span multiple failover scopes, e.g. failure scopes covering local cluster 120 as well as failure scopes covering remote cluster 140, and may select a node in a remote failover scope as the best option for failover even though there may be a local node that may also be able to handle the failover operation, depending upon the respective health information for these nodes. Moreover, the clusterware application instance may utilize other information known to the clusterware application instance, such as an estimated amount of time to perform a failover operation to a local node 103-105 in a local cluster 120, an estimated amount of time to perform a failover operation to a remote node 142-148 in a remote cluster 140, a physical configuration of nodes 102-105 in the local cluster 120 or power configuration of nodes 102-105 in the local cluster 120, which may provide insight into which nodes are likely to be susceptible to the same power loss as the faulty node 102.

Thus, for example, in response to the detected imminent power loss to the node 102, the clusterware application instance running on the node 102 initiates a failover process. As part of the failover process, the clusterware application instance of node 102 looks at the most recent heartbeat signal information received from the other nodes 103-105 of the current or local failover scope, which in this case encompasses all of the nodes 102-105 of the local cluster 120. It should be appreciated, however, that the local cluster 120 may comprise a plurality of failover scopes in which case the current or local failover scope would be whatever failover scope includes the faulty node, e.g., node 102.

Based on the health information received in the most recent heartbeat signals from the nodes 103-105, the clusterware application instance of node 102 determines if there is a node 103-105 in the local failover scope that is a sufficient candidate for performing the failover operation. For example, the clusterware application instance may first determine if there are any nodes in the local failover scope that are not susceptible to the same loss of power. Of these nodes, if any, those having the highest available resources are selected over those having lower available resources. From these, a best candidate is determined as a node not susceptible to the loss of power and having a highest amount of available resources to handle the failover of the application(s) to the selected node.

The determination of whether a node 103-105 is susceptible to the same loss of power may involve first determining whether the health information indicates that the node 103-105 detected an imminent power loss, and if so, the amount of time that the node 103-105 indicates it can-operate on UPS power. Moreover, if the clusterware application has additional information regarding the physical and/or electrical configuration of the power supply to the various nodes of the cluster 120, the clusterware application may use that information along with the health information from the various nodes 102-105 to determine the scope of affect of the power loss. Through the determination of the scope of the power loss, the clusterware application instance may determine which, if any, of the nodes 102-105 in the current failover scope are not affected by the power loss and, if one or more are not affected, may look at each unaffected node's current resource usage information in the health information and select a node 103-105 to which to target for performing the failover operation based on the current resource usage information. For example, the node having the highest performance, e.g., highest available processor resources, lowest memory usage, etc., may be selected as the target for the failover operation.

Moreover, the clusterware application may predict the impact of the failover of application(s) to the node 103-105 by estimating the amount of resource usage after the failover of the application(s) so as to take into account the affect of the running of the applications(s) that are being failed over on the resources of the node 103-105. The clusterware application may take the resource utilization information last communicated to the clusterware application in a heartbeat signal from the faulty node 102 as an estimate of what resources would be utilized in addition to those already utilized by the node 103-105 should the failover of the application(s) be performed to that node 103-105. In such a case, the clusterware application may select a node to which the impact of the failover application has the least negative affect on the operation of the node, i.e. the node that has the most remaining available resources after the application(s) are failed over to that node, according to the prediction.

If no nodes in the current failover scope are unaffected by the power loss, a determination is made by the clusterware application as to whether the failover operation should select a node 103-105 in the current failover scope, even though it may lose power, or should select a node 142-148 in a remote failover scope. Essentially this determination is made based on a predicted amount of time that would be required for the failover operation to be performed with the remote node 142-148 in the remote failover scope, e.g., remote cluster 140. This time to perform the failover operation to the remote node may be based on an estimated connection speed between the local faulty node 102 and the remote node. 142-148 as well as the amount of data that must be transmitted to perform the failover operation. Preferably, such estimates should be pessimistic in nature so as to avoid overestimating the ability to perform the failover to the remote node 142-148.

If the predicted amount of time to perform the failover operation exceeds the amount of time that the faulty node 102 can operate based on UPS power, then the failover to the remote node 142-148 is not selected as the optimum failover option. To the contrary, failover to a local node 103-105 in a local failover scope, i.e. the failover scope in which the faulty node 102 is present, may be selected as the target for the failover operation even if this local node 103-105 may itself be susceptible to the same power loss. The local node 103-105 may be selected because a failover to another local node 103-105 is performed much more rapidly than to a remote node 142-148 in a remote failover scope. This is due to the time required for transmission of data, but also due to the fact that many local failover scopes use a shared storage approach where each node 102-105 may share the application state data on a shared storage device or system (not shown).

In one illustrative embodiment, if the predicted time, required to perform the failover operation to a remote node 142-148 in a remote failover scope exceeds the amount of time that the faulty node 102 may operate on UPS power, the failover may be initiated at both a local node (potentially subject to the same power loss) 103-105 in a local failover scope and a remote node 142-148 in a remote failover scope. The failover to the-remote node 142-148 may occur as far as possible under the faulty node's UPS power and, once the failover operation to the local node 103-105 is complete, and that local node 103-105 subsequently needs to failover to another node, the failover to the remote node 142-148 may be completed from this local node 103-105. In such an embodiment, as part of the failover operation, the faulty node's clusterware application instance may inform the clusterware application instance on the local node 103-105, targeted by the failover operation, of the identity of the remote node 142-148 that is also targeted by the failover operation. Similarly, the remote node 142-148 may be informed of the identity of the local node 103-105 that is targeted for the failover operation. Prior to the final failure of the faulty node 102, or after completion of the failover operation to the targeted local node 103-105, the clusterware application instance on the faulty node 102 may inform the targeted local node 103-105 of the status of the failover to the remote node 142-148 so that it can continue the failover operation in the event that the targeted local node 103-105 must subsequently failover to another node. In this way, the time required to perform the failover to the remote node 142-148 is reduced with each subsequent failover to a targeted local node 103-105 until the failover to the remote node 142-148 can be performed completely.

Thus, using the mechanisms of the illustrative embodiments, a combination of failover scopes and individual health information for nodes in the failover scopes is used as a basis for selecting a best approach to performing failover of application(s) on a faulty node to another node in a local or remote failover scope. The actual operations performed in order to perform the failover to another node are generally known in the art and thus, a detailed explanation is not provided herein. Rather the mechanisms of the illustrative embodiments are directed to the selection of the most appropriate target node, or nodes, for the failover operation.

Figure 3:
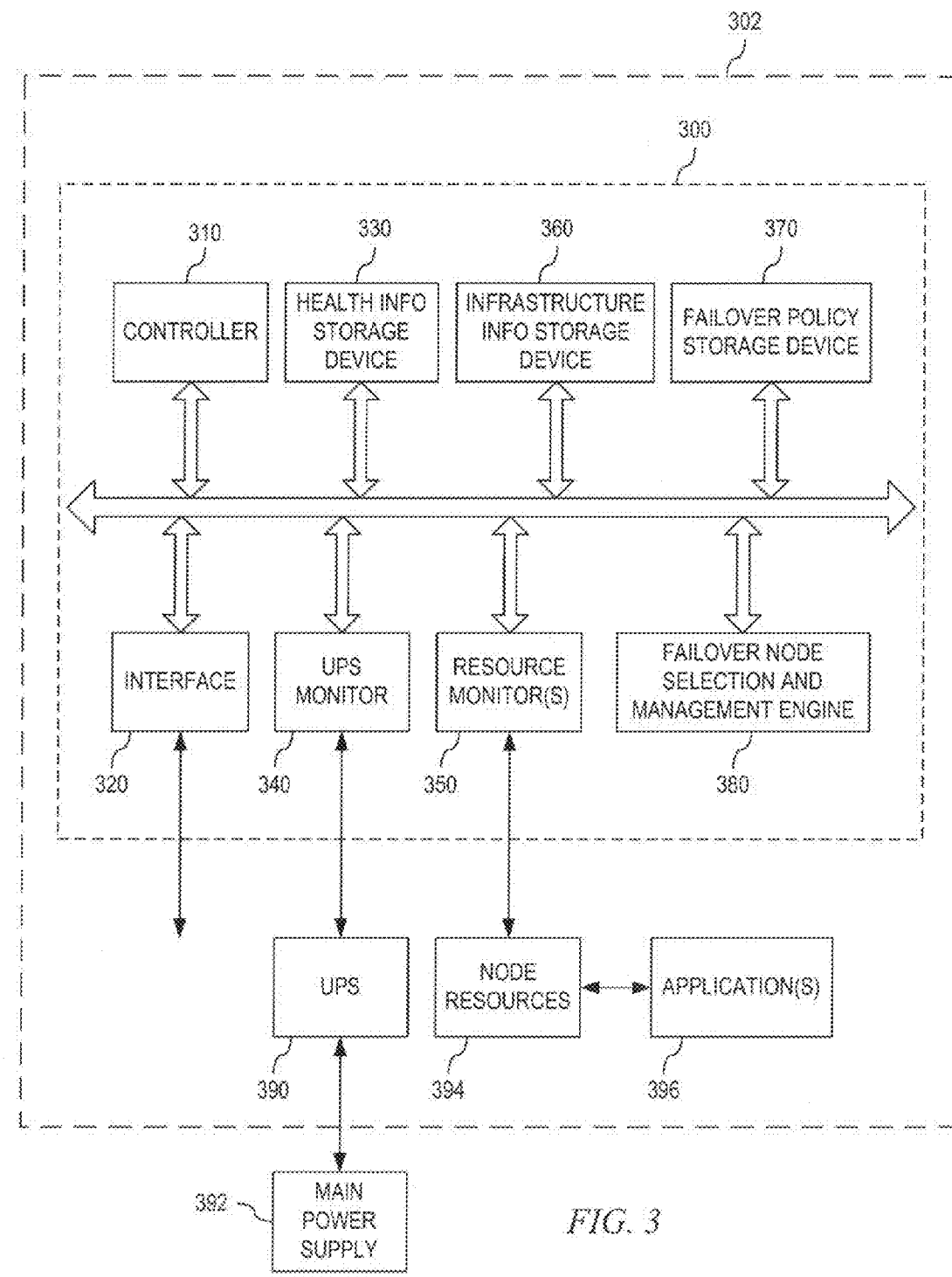
FIG. 3 is an example block diagram of a clusterware mechanism in accordance with one illustrative embodiment.

FIG. 3 is an example block diagram of a clustetware mechanism in accordance with one illustrative embodiment. The clusterware mechanism may be provided as software, hardware, or any combination of software and hardware. In one illustrative embodiment, the clusterware mechanism is provided as software executed by one or more processors of one or more data processing devices, which themselves are referred to herein as "nodes." With regard to FIG. 1, instances of this clusterware mechanism may be executing on each of the server computing devices 102-105 and 142-148 of the local and remote clusters 120 and 140, for example. Alternatively, a single instance of the clusterware mechanism may be provided on a single computing device in each of the local and remote clusters 120 and 140 which is responsible for managing the corresponding cluster 120 or 140.

As shown in FIG. 3, the clusterware mechanism 300, implemented on or in association with node 302, comprises a controller 310, an interface 320, a health information storage device 330, a UPS monitor 340, one or more resource monitor(s) 350, an infrastructure information storage device 360, a failover policy storage device 370, and a failover node selection and management engine 380. The controller 310 comprises logic that controls the overall operation of the clusterware mechanism 300 and orchestrates the operation of the other elements 320-380. The interface 320 provides a communication interface through which the clusterware mechanism 300 may receive heartbeat signals from, and transmit heartbeat signals to, other nodes in a local, and optionally a remote, cluster of the node,302 on which the clusterware mechanism 300 is implemented. Moreover, the interface 320 provides a command interface through which the clusterware mechanism 300 may instruct the node on which it is implemented to perform a failover operation to a selected target node or nodes.

The health information storage device 330 stores the health information that has been received from heartbeat signals received from the nodes of a local cluster. The health information may include an identity of the node, an indicator of whether the node has encountered an imminent power failure, an amount of time the node can continue to operate in view of the imminent power failure, and resource usage information for the node. This information may be used by the failover node selection and management engine 380 in the manner described above to select an appropriate node, or nodes, to target for performance of a failover operation and furthermore, to manage the failover operation.

The UPS monitor 340 monitors the operational site of the node 302's UPS 390. As such, if the UPS 390 detects a failure in the main power supply 392, the UPS 390 may send a notification message to the UPS monitor 340 indicating that the UPS is operating on battery power and providing an estimate as to the amount of time the node 302 may continue to operate under current loads based on the UPS battery power. The UPS monitor 340 may gather this information from the UPS 390 and use it to provide health information, for node 302, that is stored in the health information storage device 330.

Similarly, the resource monitor(s) 350 may monitor various node resources 394 and provide measures of the node resource utilization for storage in the health information storage device 330 for node 302. The node resources 394 may be processor resources, memory resources, storage resources, bandwidth, or any other resource of a data processing device that may be indicative of the data processing device's capability to handle failover of application(s). The measures of the node resource utilization may be, for example, a percentage of processor resources that are currently being utilized, a percentage of memory resources currently being utilized, an amount of storage space that is used, or the like. Alternatively, such measures may identify an amount of available resources. Moreover, percentages need not be used; other units of measure may be used that are appropriate for the particular resource that is being measured, e.g., processor cycles, memory space units, storage space units, or the like.

The information in the health information storage device 330 for the current node 302 may be communicated with other nodes in the local cluster as part of a heartbeat signal or other message broadcast to the other nodes of the local cluster by controller 310 via interface 320. Moreover, this information is used by the failover node selection and management engine 380 to select and manage nodes as targets for failover operations. This health information may be used in conjunction with infrastructure information stored in the infrastructure information storage device 360 to perform such selection and management of a target node to which to perform the failover operation. Such infrastructure information may provide information regarding the physical arrangement, electrical arrangement, etc., of the nodes of a local cluster, for example. For example, in one illustrative embodiment, the infrastructure information may comprise information about, the topology of connectivity of nodes to backup power supply sources. Infrastructure information is not necessary to the operation of the failover node selection and management engine 380 but may be used in some illustrative embodiments in the manner previously described above to assist in determining the scope of a cause of a failure of a faulty node.

The failover policy storage device 370 may store a default failover policy that may be used when conditions do not dictate overriding of this failover policy, e.g., a cause of a fault is localized to a single node in a local cluster. The failover policy may further specify the various failover scopes that are utilized by the failover node selection and management engine 380, along with the health information and optional infrastructure information, to select an appropriate node, or nodes, to target for performing the failover operation.

The failover node selection and management engine 380 may select an appropriate node, or nodes, in a local and/or remote failover scope, which may be part of a local and/or remote cluster, and may manage and perform the failover operation. As part of the failover operation, application state information for the applications 396 running on the node 302 may be migrated to the selected node or nodes, or storage devices associated with the selected node or nodes, such that application instances provided on those selected node or nodes may be updated to the state of the application(s) on node 302 and used to handle operations on behalf of application(s) 396 in response to the failure of node 302. In some illustrative embodiments, the application(s) 396 themselves may be migrated, although in today's environment it is more likely that only the state information needs to be migrated.

It should be appreciated that the selection logic provided in the failover node selection and management engine 380 may operate in the manner previously described-above with regard to FIG. 1 when performing the selection process. As such, the failover node selection and management engine 380 may collaborate with other clusterware mechanisms of other nodes to come to a consensus as to which node(s) should be selected as the target(s) for the failover operation. Alternatively, the failover selection and management engine 380 may operate autonomously with regard to the selection of the target node(s) based on information gathered from the other nodes through heartbeat messages, or the like.

As mentioned above, the illustrative embodiments may utilize infrastructure information in modifying the failover policy and selecting a node as the target of a failover operation. This infrastructure information may include information about the topology of connectivity of nodes to backup power supply sources, i.e. information identifying which nodes are connected to which UPS's and backup power supplies. Based on the characteristics of the various UPS's, e.g., an amount of backup power supply available through each UPS, a target node may be selected. Moreover, nodes that are able to be connected to different UPS's, such as through a switching mechanism or the like, may be configured so as to maximize the availability time of the nodes for performing failover operations. The clusterware applications may control such switching to achieve a desired optimal topological configuration between the nodes and the available UPS's and backup power supplies.

In yet another illustrative embodiment, a configuration of the nodes in the local failover scope may be modified so as to consolidate resource on a selected subset of the nodes based on the health information and the infrastructure information. The modification of the configuration of the nodes may involve, for example, migrating resource intensive applications from a current node to an alternative node so that resources are freed for accommodating a failover of one or more applications from the faulty node experiencing the imminent power failure. Other modifications to nodes, such as freeing memory, reducing virtual memory allocations, reducing the number of logical partitions, or any other modifications that affect the amount of reserved resources on nodes may be used to adjust the configuration of the nodes to accommodate failover of one or more applications from a faulty node.

Of course, with any of these illustrative embodiments, if a faulty node becomes operational again, the system may be restored to an original configuration whereby the one or more applications may be migrated back to the faulty node (which is no longer faulty). Similarly, resource utilization, node configurations, and the like may be restored to previous configurations so as to return the system to as close as possible to the original configuration. In this way, nodes of a local failover scope may be returned to an original configuration in which resource utilization is no longer consolidated in the selected subset of the one or more additional nodes.

Moreover, as mentioned above, whether to failover to a local node or a remote node may be determined, at least partially, based on the amount of time that the faulty node can continue to operate on a backup power supply provided via the faulty node's UPS. In order to maximize this amount of time, the clusterware application may adjust resource utilization of applications on the faulty node so as to reduce resource utilization and, as a result, minimize power consumption. In this way, the faulty node will be able to operate for a longer period of time on a backup power supply and potentially provide additional time-for completing a failover operation to a remote node.

Figure 4:
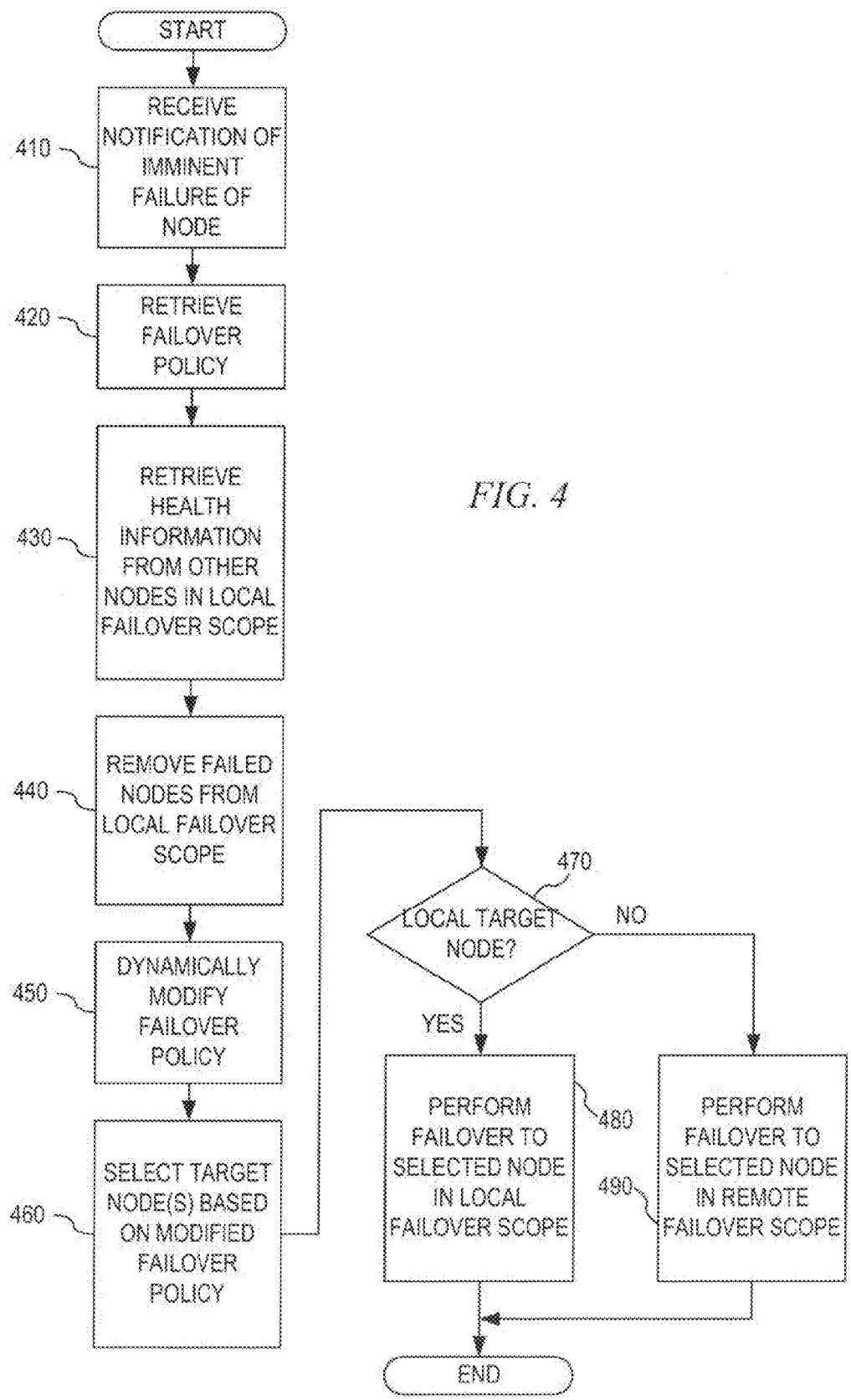
FIG. 4 is a flowchart outlining an example operation for selecting a node as a target for a failover operation in accordance with one illustrative embodiment.

FIG. 4 is a flowchart outlining an example operation for selecting a node as a target for a failover operation in accordance with one illustrative embodiment. The operation outlined in FIG. 4 may be performed by a clusterware mechanism, such as that shown in FIG. 3 and described above. Moreover, the operation may be performed by each instances of the clusterware mechanism implemented in local and remote clusters of a high availability cluster. It is assumed, for purposes of this description, that the operation outlined in FIG. 4 is performed on a node that has detected a failure of its own main power supply and must initiated a failover operation. Furthermore, for simplicity, it will be assumed that the node operates autonomously with regard to the selection of target node(s) for the failover operation. Those of ordinary skill in the art will recognize, in view of the present description, the manner by which the operation shown in FIG. 4 may be expanded to accommodate collaboration of nodes in the selection process.

As shown in FIG. 4, the operation starts by receiving an indication of a failure of the node's main power supply and an indication of an amount of time that the node can remain operational using a backup power supply (step 410). The failover policy, identifying the failover scopes and nodes within these failover scopes, for the faulty node is retrieved (step 420). The health information from the latest heartbeat signals from the other nodes in a local failover scope is retrieved and analyzed to identify the scope of the power failure (step 430). Any nodes that are determined to have already failed, i.e. are not surviving nodes, are removed from consideration in the failover policy (step 440).

Based on the health information for the nodes in the local failover scope, the determined scope of the power failure, information regarding an amount of time required for failover to a remote node in a remote failover scope, and optionally, infrastructure information, the failover scopes of the failover policy are dynamically modified to identify nodes that are within the scope of the power failure, nodes that are not within the scope of the power failure, and relative measures of the nodes with regard to suitability as candidates for failover of application(s) on the faulty node (step 450). One or more best candidate nodes for failover are selected based on the dynamically modified failover policy (step 460). The selection of the one or more best candidate nodes for failover may be performed in a manner such as previously described, e.g., selecting a local node, if one exists that is not subject to the power failure, determining if failover to a remote node can be performed based on how long the faulty node can operate on backup battery power and the time to perform a remote failover operation, selecting a local node that is subject to the power failure in the event that the failover operation cannot be performed within the amount of time the faulty node can remain operational on backup battery power, etc.

A determination is made as to whether the selected one or more nodes are in a local failover scope of the failover policy (step 470). If so, then the failover operation is driven to the selected surviving node in the local failover scope (step 480). If not, then the failover operation is driven to a remote node in a remote failover scope (step. 490). The operation then terminates. It should be appreciated that, in some illustrative embodiments, both branches to steps 480 and 490 may be pursued, such as when the remote failover operation cannot be completed within the operational time period of the faulty node using backup battery power and the failover started to the remote node while also being performed to a local node that is subject to the same power failure problems, as described previously.

Thus, the illustrative embodiments provide mechanisms for dynamically modifying failover scopes and failover policies based on the dynamically determined health information for the nodes in the various failover scopes. Nodes determined to not be available are automatically removed from consideration within the various failover scopes. Moreover, one or more best candidate nodes are selected based on their health information and predicted amounts of time that the nodes can remain operational after a power loss, an amount of time required to perform the failover operation, and the like. Thus, with the mechanisms of the illustrative embodiments, availability of applications is increased by eliminating repeated failover attempts to nodes that are affected by a cause of failure that has a scope encompassing more than one node.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for performing a failover operation of an application from a faulty node of a high availability cluster to a selected target node, comprising:
   receiving a notification of an imminent failure of the faulty node;
   receiving health information from one or more additional nodes of a local failover scope of a failover policy associated with the faulty node, wherein the faulty node and the one or more additional nodes are members of the local failover scope;
   dynamically modifying the failover policy based on the health information from the one or more additional nodes of the local failover scope;
   selecting a node from the modified failover policy as the target node for failover of an application running on the faulty node to the target node; and
   performing failover of the application to the target node based on the selection of the node from the modified failover policy, wherein the health information from the one or more additional nodes of the local failover scope comprises, for each additional node in the one or more additional nodes, information identifying an amount of time the additional node can remain operational based on a backup power supply.

2. The method of claim 1, wherein the target node is one of the one or more additional nodes of the local failover scope or a node of a remote failover scope that is geographically remote from the one or more additional nodes of the local failover scope.

3. The method of claim 1, wherein selecting a node from the modified failover policy as the target node for failover of the application running on the faulty node to the target node comprises selecting the node based on the amount of time the additional nodes can remain operational based on their respective backup power supplies and resource utilization information from the one or more additional nodes.

4. The method of claim 3, wherein selecting a node from the modified failover policy as the target node for failover of the application running on the faulty node to the target node comprises selecting the node from the modified failover policy based on the health information and infrastructure information identifying at least one of a physical arrangement or electrical arrangement of the faulty node and one or more additional nodes in the local failover scope.

5. The method of claim 4, wherein the infrastructure information comprises information about a topology of connectivity of nodes to backup power supply sources.

6. The method of claim 5, further comprising:
   modifying a configuration of the one or more additional nodes of the local failover scope, so as to consolidate resource utilization on a selected subset of the one or more additional nodes, based on the health information and the infrastructure information.

7. The method of claim 6, further comprising:
   in response to a detection of a restoration of the faulty node, returning the configuration of the one or more additional nodes of the local failover scope to an original configuration in which resource utilization is no longer consolidated in the selected subset of the one or more additional nodes.

8. The method of claim 1, further comprising:
   modifying a resource utilization of the application on the faulty node so as to maximize an amount of time that the faulty node can remain operational on battery backup power.

9. The method of claim 1, wherein selecting a node from the modified failover policy as the target node for failover of the application running on the faulty node to the target node comprises:

performing a collaboration between instances of a clusterware applications running on each of the nodes of the faulty node and the one or more additional nodes to select the target node.

10. The method of claim 1, wherein receiving health information from one or more additional nodes of a local failover scope of a failover policy associated with the faulty node comprises receiving heartbeat signals from the one or more additional nodes, wherein the heartbeat signals include an indication of an amount of time a corresponding node in the one or more additional nodes is able to remain operational in view of the cause of the fault on the faulty node.

11. The method of claim 1, wherein the faulty node and the one or more additional nodes are processor cores of one or more data processing devices.

12. A method, in a data processing system, for performing a failover operation of an application from a faulty node of a high availability cluster to a selected target node, comprising:

receiving a notification of an imminent failure of the faulty node;

receiving health information from one or more additional nodes of a local failover scope of a failover policy associated with the faulty node, wherein the fault node and the one or more additional nodes are members of the local failover scope;

dynamically modifying the failover policy based on the health information from the one or more additional nodes of the local failover scope;

selecting a node from the modified failover policy as the target node for failover of an application running on the faulty node to the target node; and performing failover of the application to the target node based on the selection of the node from the modified failover policy, wherein the health information from the one or more additional nodes of the local failover scope identifies a measure of survivability of each additional node in the one or more additional nodes with regard to a cause of the imminent failure of the faulty node, wherein the method further comprises:

determining which additional nodes, if any, in the one or more additional nodes of the local failover scope are affected by the cause of the imminent failure of the faulty node; and determining which additional nodes, if any, in the one or more additional nodes of the local failover scope that are not affected by the cause of the imminent failure of the faulty node, wherein the failover policy is dynamically modified based on the determination of which additional nodes, if any, are affected or not affected by the cause of the imminent failure of the faulty node.

13. The method of claim 12, wherein the health information from the one or more additional nodes of the local failover scope comprises, for each additional node in the one or more additional nodes information identifying an amount of time the additional node can remain operational based on a backup power supply.

14. A method, in a data processing system, for performing a failover operation of an application from a faulty node of a high availability cluster to a selected target node, comprising:

receiving a notification of an imminent failure of the faulty node;

receiving health information from one or more additional nodes of a local failover scope of a failover policy associated with the faulty node, wherein the faulty node and the one or more additional nodes are members of the local failover scope;

dynamically modifying the failover policy based on the health information from the one or more additional nodes of the local failover scope;

selecting a node from the modified failover policy as the target node for failover of an application running on the faulty node to the target node; and performing failover of the application to the target node based on the selection of the node from the modified failover policy, wherein the faulty node and the one or more additional nodes have different uninterruptable power supply (UPS) capabilities and wherein the faulty node and the one or more additional nodes comprise a UPS monitor for monitoring a state of the UPS to identify power failures and an amount of available power from a backup battery of the UPS.

15. A method, in a data processing system, for performing a failover operation of an application from a faulty node of a high availability cluster to a selected target node, comprising:

receiving a notification of an imminent failure of the faulty node;

receiving health information from one or more additional nodes of a local failover scope of a failover policy associated with the faulty node, wherein the faulty node and the one or more additional nodes are members of the local failover scope;

dynamically modifying the failover policy based on the health information from the one or more additional nodes of the local failover scope;

selecting a node from the modified failover policy as the target node for failover of an application running on the faulty node to the target node; and performing failover of the application to the target node based on the selection of the node from the modified failover policy, wherein selecting a node from the modified failover policy as the target node for failover of the application running on the faulty node to the target node comprises:

determining a scope of affect of a cause of the imminent failure of the faulty node;

determining an amount of time that the faulty node can operate on a battery backup power supply based on health information reported by the faulty node; and selecting the target node as a remote node from a remote failover scope, comprising nodes that are physically located at a remote site from that of the faulty node and the one or more additional nodes in the local failover scope, in response to a determination that the scope of the cause of the imminent failure affects all of the faulty nodes and the one or more additional nodes and the health information reported by the faulty node indicates that the faulty node is able to operate on battery backup power for a sufficient amount of time to complete a failover operation to the remote node.

16. The method of claim 15, wherein selecting a node from the modified failover policy as the target node for failover of the application running on the faulty node to the target node comprises:

determining a scope of affect of a cause of the imminent failure of the faulty node;

determining an amount of time that the faulty node can operate on a battery backup power supply based on health information reported by the faulty node; and selecting the target node as a node in the one or more additional nodes of the local failover scope in response to a determination that the amount of time that the faulty node can operate on the battery backup power supply is less than a required amount of time needed to complete a failover operation to a remote node of a remote failover scope comprising nodes that are physically located at a remote site from that of the faulty node and the one or more additional nodes in the local failover scope.

17. The method of claim 16, wherein performing the failover of the application comprises performing the failover of the application to both a target node selected from the one or more additional nodes of the local failover scope and a remote node in the remote failover scope at approximately a same time, such that the failover of the application to the remote node is performed as long as the faulty node has power from the backup power supply at which point the failover of the application to the remote node terminates.

18. The method of claim 17, wherein, in the event that the target node detects an imminent failure of the target node, the failover of the application to the remote node is continued from a point at which the failover of the application terminated.

19. A computer program product comprising a non-transitory computer recordable-medium having a computer readable program recorded thereon, wherein the computer readable program, when executed on a computing device, causes the computing device to:

receive a notification of an imminent failure of a faulty node;
  receive health information from one or more additional nodes of a local failover scope of a failover policy associated with the faulty node, wherein the faulty node and the one or more additional nodes are members of the local failover scope;
  dynamically modify a failover policy based on the health information from the one or more additional nodes of the local failover scope;
  select a node from the modified failover policy as the target node for failover of an application running on the faulty node to the target node; and
  perform failover of the application to the target node based on the selection of the node from the modified failover policy, wherein the health information from the one or more additional nodes of the local failover scope comprises, for each additional node in the one or more additional nodes, information identifying an amount of time the additional node can remain operational based on a backup power supply.

20. An apparatus, comprising:

a processor; and
a memory coupled to the processor, wherein the memory comprises instructions which, when executed by the processor, cause the processor to:
receive a notification of an imminent failure of a faulty node;
receive health information from one or more additional nodes of a local failover scope of a failover policy associated with the faulty node, wherein the faulty node and the one or more additional nodes are members of the local failover scope;
dynamically modify a failover policy based on the health information from the one or more additional nodes of the local failover scope;
select a node from the modified failover policy as the target node for failover of an application running on the faulty node to the target node; and
perform failover of the application to the target node based on the selection of the node from the modified failover policy, wherein the health information from the one or more additional nodes of the local failover scope comprises, for each additional node in the one or more additional nodes, information identifying an amount of time the additional node can remain operational based on a backup power supply.

* * * * *